(12) United States Patent
Chao et al.

(10) Patent No.: US 8,491,246 B2
(45) Date of Patent: Jul. 23, 2013

(54) SECURING STRUCTURE WITH URGED FASTENER

(75) Inventors: Chien-Yu Chao, Taipei Hsien (TW); Yen-Chih Chen, Taipei Hsien (TW)

(73) Assignee: Foxconn Technology Co., Ltd., New Taipei (TW)

( * ) Notice: Subject to any disclaimer, the term of this patent is extended or adjusted under 35 U.S.C. 154(b) by 461 days.

(21) Appl. No.: 12/828,210

(22) Filed: Jun. 30, 2010

(65) Prior Publication Data
US 2011/0274513 A1 Nov. 10, 2011

(30) Foreign Application Priority Data
May 6, 2010 (TW) .............................. 99114493 A

(51) Int. Cl.
*F16B 21/02* (2006.01)
(52) U.S. Cl.
USPC ............................ 411/349; 411/341; 411/347
(58) Field of Classification Search
USPC ................... 411/340–344, 347, 349
See application file for complete search history.

(56) References Cited

U.S. PATENT DOCUMENTS

| 1,803,431 | A | * | 5/1931 | Hill | 411/349 |
|---|---|---|---|---|---|
| 1,895,826 | A | * | 1/1933 | Trudeau | 267/263 |
| 2,252,286 | A | * | 8/1941 | Hathorn | 411/349 |
| 2,478,972 | A | * | 8/1949 | Luce | 411/551 |
| 2,620,539 | A | * | 12/1952 | Ougljesa | 411/349 |
| 2,900,697 | A | * | 8/1959 | Freeman Cuss | 411/349 |
| 3,480,311 | A | * | 11/1969 | Lanham | 403/408.1 |
| 3,510,922 | A | * | 5/1970 | Dzus et al. | 411/555 |
| 3,675,280 | A | * | 7/1972 | Winslade | 411/552 |
| RE30,801 | E | * | 11/1981 | Gley | 411/349 |
| 4,657,462 | A | * | 4/1987 | Hoen | 411/552 |
| 5,361,925 | A | * | 11/1994 | Wecke et al. | 220/325 |
| 5,518,350 | A | * | 5/1996 | Kyprios | 411/343 |
| 6,267,543 | B1 | * | 7/2001 | David et al. | 411/552 |
| 7,607,553 | B2 | * | 10/2009 | Weber | 220/328 |
| 8,342,328 | B2 | * | 1/2013 | Trapp et al. | 206/480 |
| 8,430,615 | B2 | * | 4/2013 | Chen et al. | 411/107 |
| 2010/0098513 | A1 | * | 4/2010 | Wang | 411/343 |
| 2011/0255935 | A1 | * | 10/2011 | Chen et al. | 411/347 |
| 2011/0274513 | A1 | * | 11/2011 | Chao et al. | 411/344 |

* cited by examiner

*Primary Examiner* — Victor Batson
*Assistant Examiner* — Tyler Johnson
(74) *Attorney, Agent, or Firm* — Altis Law Group, Inc.

(57) ABSTRACT

An exemplary securing structure includes a base, a fastener, and a spring mounted around the fastener. The base defines a through hole, and two slots located adjacent to and communicating with the securing hole. Two barriers are formed at a bottom of the base corresponding to the slots. A gap is defined between the bottom surface and each of the barriers. The fastener includes a head, a bolt, and two blocks extending outwardly from a periphery of the bolt corresponding to the slots, respectively. When the bolt is extended through the securing hole with the blocks extending through the slots until the blocks are received in the gaps, the fastener is then rotatable to cause the block to escape from the gap and abut on the bottom surface of the base, with the spring resiliently compressed between the head of the fastener and a top side of the base.

19 Claims, 5 Drawing Sheets

SECURING STRUCTURE WITH URGED FASTENER

BACKGROUND

1. Technical Field

The present disclosure relates to securing structures, and particularly to a securing structure that is easily pre-assembled. For example, the securing structure may be pre-assembled as part of a heat dissipating device, such that the heat dissipating device can thereafter be conveniently mounted to a heat generating electronic component.

2. Description of Related Art

In the field of computers, for example, heat dissipating devices are mounted on electronic components for dissipating heat therefrom. Often, several mounting elements are needed for securing a heat dissipating device onto a circuit board so that the heat dissipating device can contact an electronic component attached on the circuit board. The mounting elements are pre-assembled on the heat dissipating device, before the heat dissipating device is transported to another location to be secured on the circuit board. Generally, each mounting element includes a bolt defining an annular groove near a bottom thereof, a spring disposed around a top of the bolt, and a ring-like clipping member. In the pre-assembling process, after the bolt extends through the heat dissipating device, the clipping member is expanded radially and outwardly to snap into the groove of the bolt. Thereby the bolt is pre-assembled to the heat dissipating device.

However, during the pre-assembling process, there is no mechanism provided in the bolt which can reliably ensure the snapping of the clipping member into the groove of the bolt. If the clipping member is not properly and firmly snapped in the groove of the bolt, the clipping member is liable to drop from the bolt during transportation of the pre-assembled heat dissipating device. In addition, after the heat dissipating device is assembled to the electronic component, the clipping members are no longer needed. As the clipping members are made of metal, a cost of the heat dissipating device is increased by the need for the clipping members.

Thus, it is desirable to overcome the described limitations.

DETAILED DESCRIPTION

Figure 1:
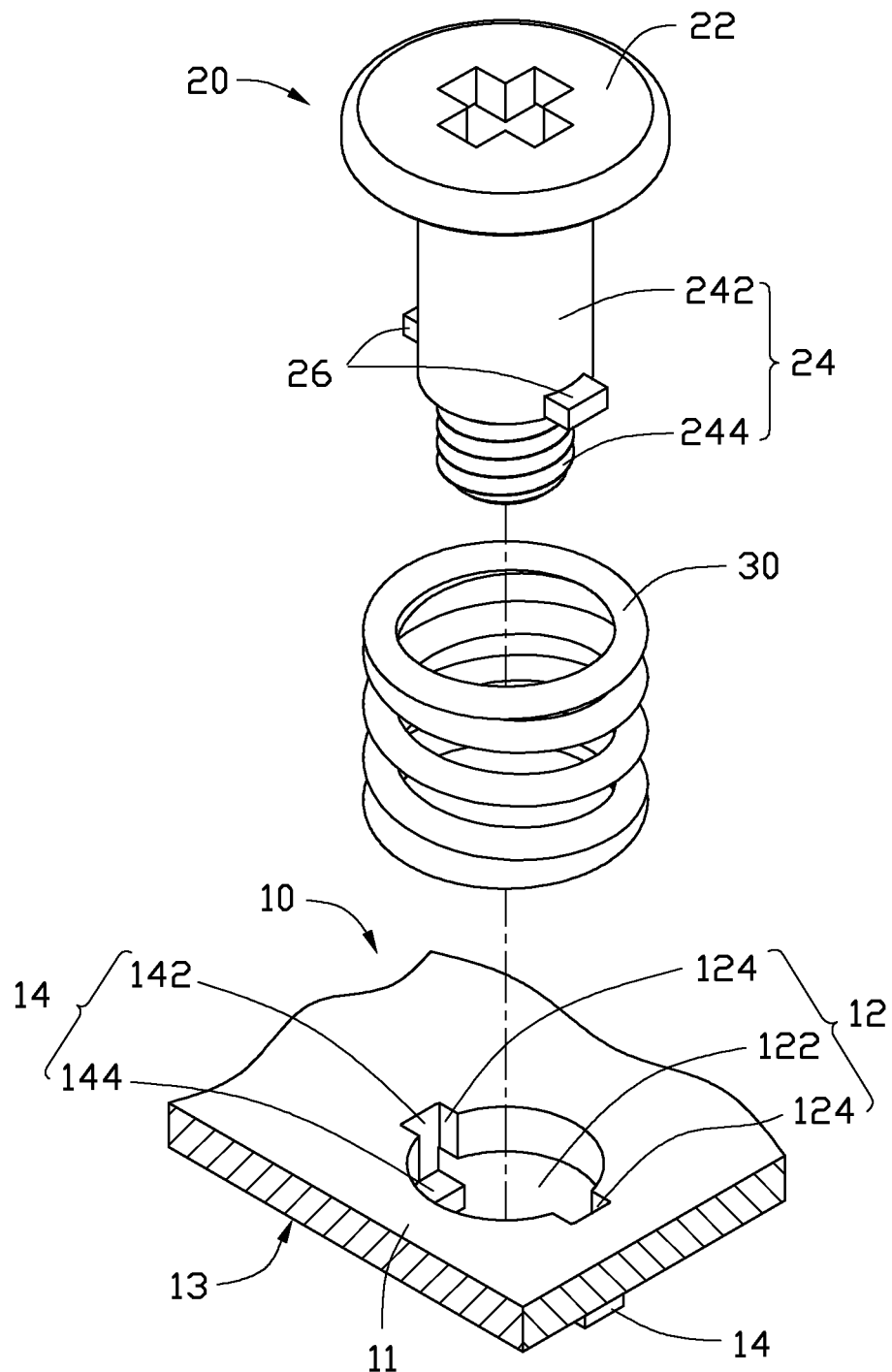
FIG. 1 is an exploded, isometric view of a securing structure in accordance with a first embodiment.
Figure 2:
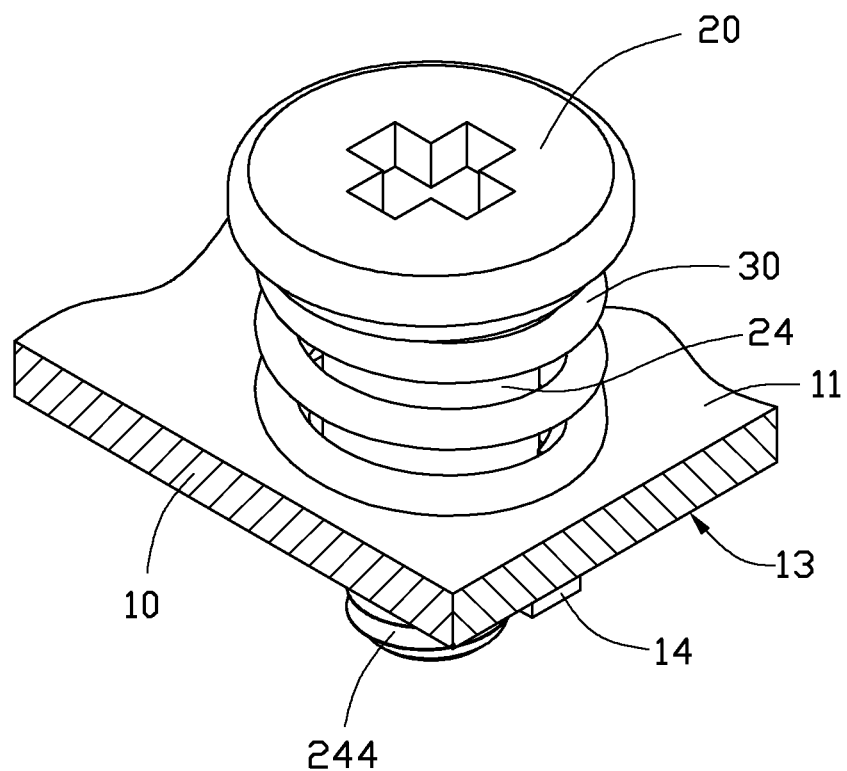
FIG. 2 is an assembled view of the securing structure of FIG. 1, showing a fastener of the securing structure mounted to a base of the securing structure.
Figure 3:
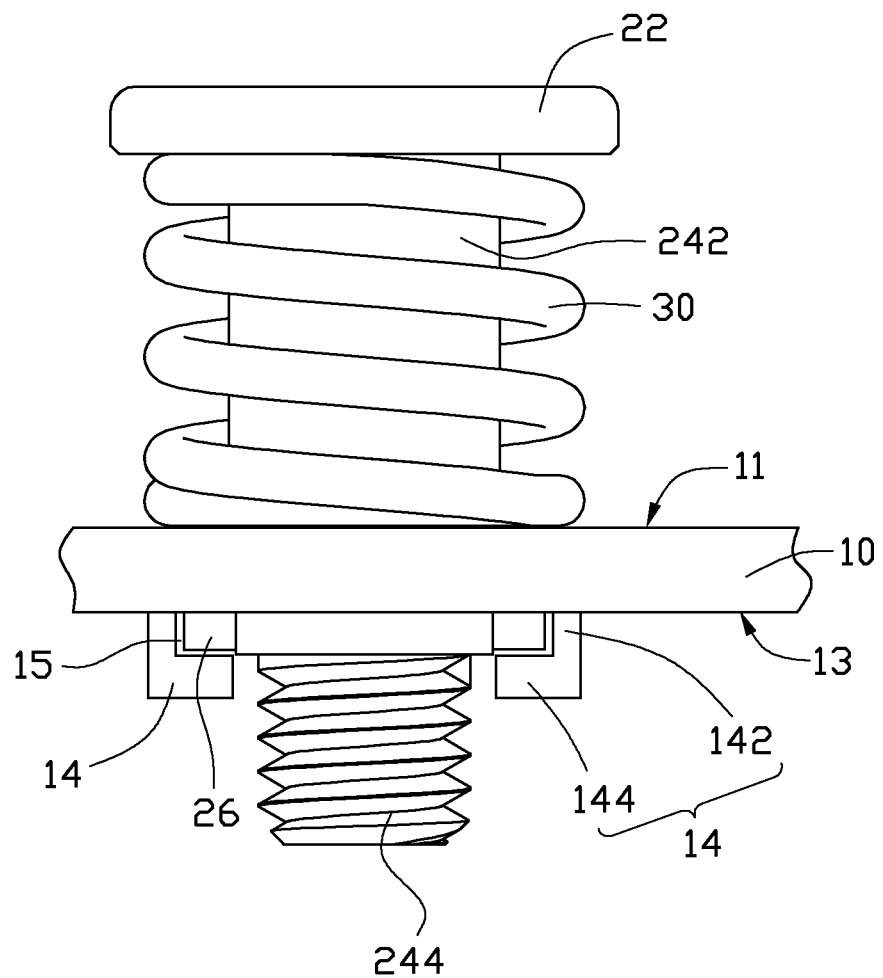
FIG. 3 is a side view of the securing structure of FIG. 2, showing the fastener of the securing structure in a preliminary position in the process of being mounted to the base of the securing structure.

Referring to FIGS. 1-3, the securing structure accordingly to a first embodiment includes a base 10, a fastener 20, and a coil spring 30 mounted around the fastener 20. The base 10 is to be mounted to another component by the fastener 20. The base 10 may, for example, be part of a substrate of a heat sink which is to be mounted to a circuit board to contact a heat generating electronic component located on the circuit board.

In the illustrated embodiment, the base 10 is generally rectangular, with a through mounting hole 12 defined at a central portion thereof. In the above-described example, the through mounting hole 12 may be located at one of four corners of the substrate of the heat sink. The mounting hole 12 includes a circular through hole 122 at a center, and two rectangular slots 124 symmetrically located at two opposite sides of the through hole 122. Each slot 124 has an inner end communicating with the through hole 122, and an outer end far away from the through hole 122.

Figure 4:
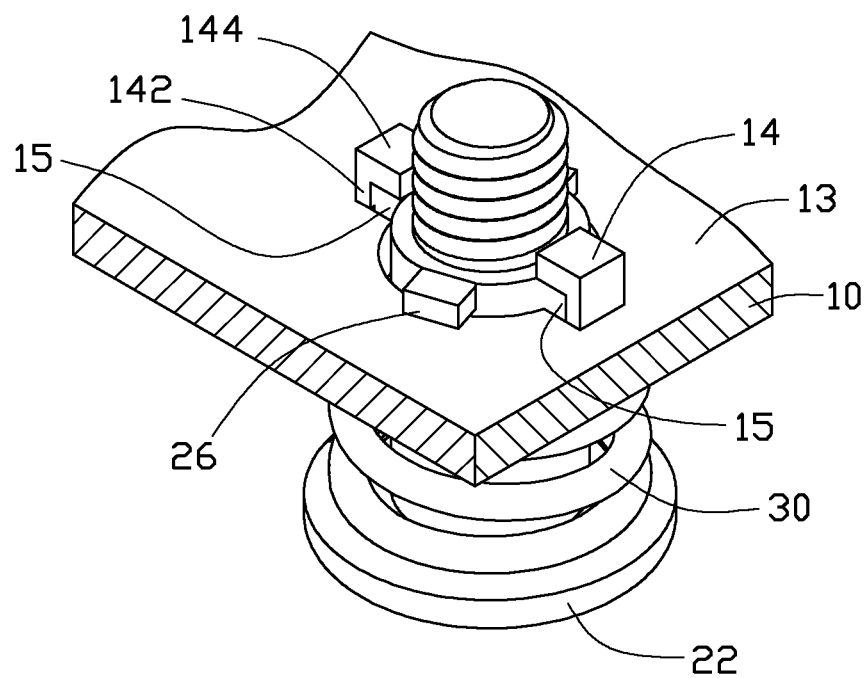
FIG. 4 is similar to FIG. 2, but viewed from another aspect, and showing the fastener in a final position in which it has been pre-assembled to the base of the securing structure.

Referring also to FIG. 4, the base 10 includes a bottom surface 13 and two barriers 14 extending downwardly from the bottom surface 13. Each of the barriers 14 is L-shaped in cross section, and includes a rectangular first portion 142 and a rectangular second portion 144 perpendicular to the first portion 142. The first portion 142 extends perpendicularly and downwardly from the bottom surface 13 of the base 10, and the second portion 144 extends horizontally from a bottom end of the first portion 142 towards an area directly below the through hole 122. The first portion 142 is located at an outer periphery of the outer end of the corresponding slot 124. The second portion 144 is parallel to and spaced from the bottom surface 13 of the base 10, with a gap 15 defined therebetween.

The fastener 20 includes a head 22, a columned bolt 24 extending downwardly from the head 22, and two blocks 26 extending perpendicularly and outwardly from an outer periphery of the bolt 24. The bolt 24 has a diameter less than that of an inner diameter of the spring 30. The outer diameter of the spring 30 is less than that of the head 22. The bolt 24 includes a fixed end section 242 adjacent to the head 22, and a free end section 244 far away from the head 22. A diameter of the free end section 244 is less than that of the fixed end section 242. A thread is defined at an outer periphery of the free end section 244 of the bolt 24. The free end section 244 of the bolt 24 is configured for engaging with a securing hole of the other component, to fix the base 10 onto the other component.

The blocks 26 have the same shape and size. Each of the blocks 26 is in the form of a rectangular tab. The blocks 26 are symmetrically arranged at two opposite sides of a lower end of the fixed end section 242. The free end section 244 of the bolt 24 has a diameter slightly less than that of the through hole 122 of the base 10, and the size of each of the blocks 26 is substantially equal to that of each of the slots 124. A thickness of each of the blocks 26 along a vertical direction is substantially equal to a depth of the gap 15 along the vertical direction. Thus, the bolt 24 with the blocks 26 is able to extend through the mounting hole 12 of the base 10. The outer diameter of the spring 30 is larger than that of the through hole 122, and thus after the free end section 244 of the bolt 24 is extended through the mounting hole 12, the spring 30 is restrained above a top surface 11 of the base 10.

Referring to FIGS. 1-4, in assembly, the spring 30 is positioned around the bolt 24 of the fastener 20, and then the spring 30 is resiliently compressed towards the head 22 to expose a lower part of the fixed end section 242 of the bolt 24 and the blocks 26. The fastener 20 is aligned with the mounting hole 12, with the free end section 244 of the bolt 24 aligned with the through hole 122 of the mounting hole 12, and the blocks 26 aligned with the slots 124 of the mounting hole 12. The bolt 24 with the blocks 26 is pressed downwardly by an operator and extends through the mounting hole 12 until the blocks 26 are fully received in the gaps 15, and a top surface of each of the blocks 26 is located below the bottom surface 13 of the base 10. Then, the fastener 20 is rotated an angle (e.g., about 90°), to cause the blocks 26 to escape from the gaps 15 and abut the bottom surface 13 of the base 10 around the through hole 122. At that time, top and bottom ends of the spring 30 respectively abut the head 22 of the fastener 20 and the top surface 11 of the base 10, with the spring 30 resiliently compressed between the head 22 of the fastener 20 and the top surface 11 of the base 10. Under the urging of the elastic force applied by the compressed spring 30, the blocks 26 constantly abut against the bottom surface 13 of the base 10. Accordingly, vertical movement of the fastener 20 is limited.

In addition, after each block 26 has escaped from the gap 15, it is difficult for the block 26 to return to the gap 15 as the depth of the gap 15 is substantially equal to the thickness of the block 14. Therefore, not only are the blocks 26 restrained by the compressed spring 30 from creeping toward the gaps 15; the blocks 26 are also in effect kept from moving completely towards the slots 124 whereat they may escape from the mounting hole 12 of the base 10. Thus, the fastener 20 is pre-assembled to the base 10 reliably, and cannot be easily displaced from the pre-assembled position even during transportation.

In the above-described securing structure, the clipping members of the conventional art (see above) are not necessary. The fastener 20 has a simple structure and accordingly a low cost. Since assembly of clipping members to bolts is not needed, the fastener 20 can be pre-assembled to the base 10 directly and more quickly. Therefore the fastener 20 can be save on manufacturing costs.

Figure 5:
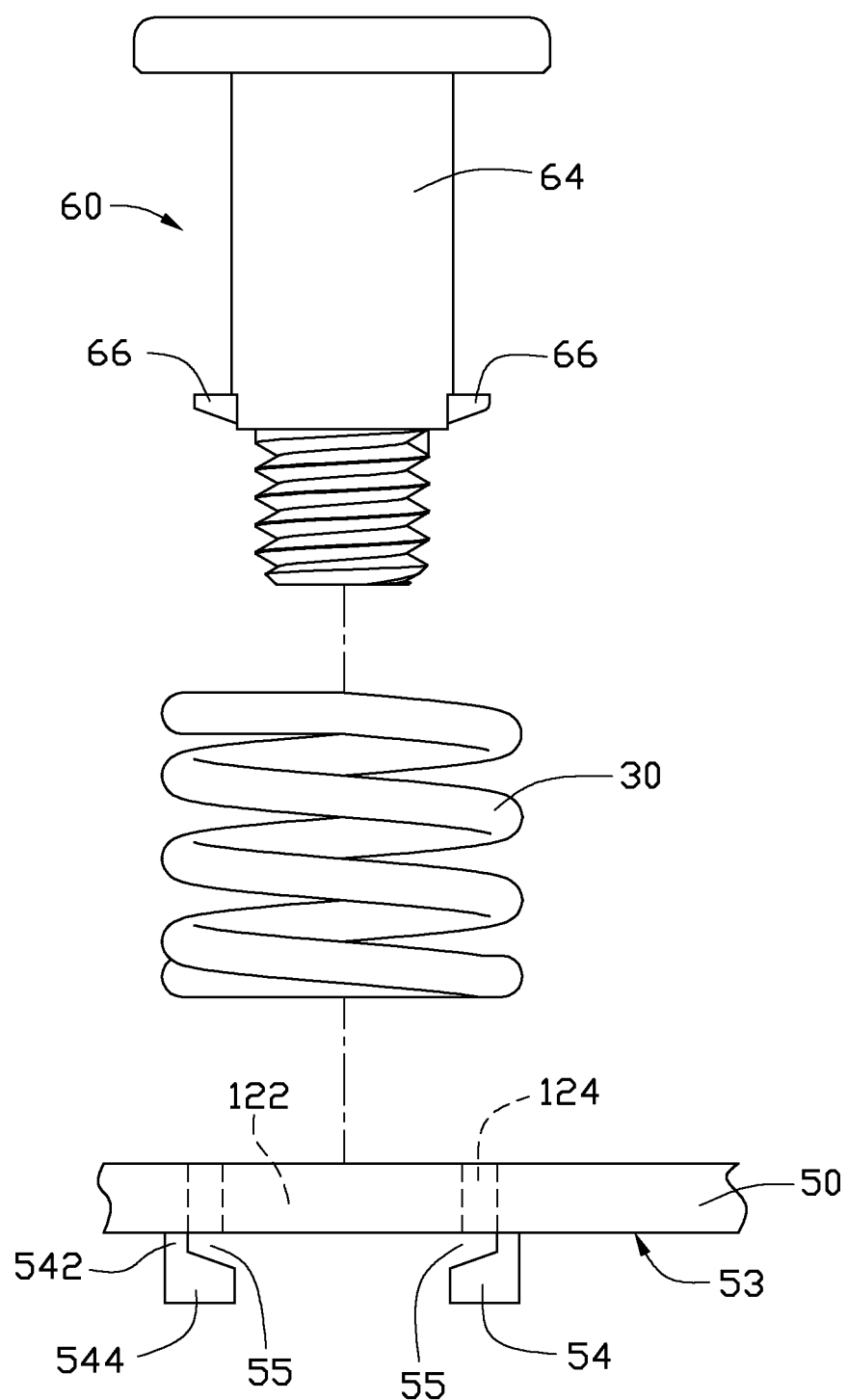
FIG. 5 is an exploded, side view of a securing structure in accordance with a second embodiment.

FIG. 5 shows a securing structure according to a second embodiment. The securing structure of the second embodiment is similar to the securing structure of the first embodiment. In particular, the securing structure of the second embodiment includes a base 50 with two barriers 54 formed at a bottom surface 53 thereof, and a fastener 60 formed with two blocks 66 corresponding to slots 124 of the base 50. Each barrier 54 includes a first portion 542 extending downwardly and perpendicularly from the bottom surface 53 of the base 50, and a second portion 544 connected with a bottom end of the first portion 542. A gap 55 is defined between an upper surface of the second portion 544 of the barrier 54 and the bottom surface 53 of the base 50. The blocks 66 extend outwardly from an outer periphery of a bolt 64 of the fastener 60. Each block 66 has a shape different from each block 26 of the securing structure of the first embodiment. The block 66 is cuneiform, with a horizontal top surface and a bottom surface extending outwardly and upwardly from the bolt 64. Thus, a thickness of the block 66 along a vertical direction gradually decreases outwardly from the bolt 64. Correspondingly, the upper surface of the second portion 544 of the respective barrier 54 is inclined relative to the bottom surface 53 of the base 50. Thus, a depth of the gap 55 corresponding to the block 66 increases along a direction from the first portion 542 towards an area directly below the through hole 122.

In the two above-described embodiments, the depth of the gap 15 (55) is substantially equal to the thickness of the block 26 (66). Actually, the depth of the gap 15 (55) can, for example, be slightly larger than the thickness of the block 26 (66), with a 0.5 mm (millimeters) to 1 mm difference therebetween.

It is to be understood, however, that even though numerous characteristics and advantages of the exemplary embodiment(s) have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A securing structure, comprising:
a base defining a through hole and at least one slot, the at least one slot located adjacent to and communicating with the through hole, at least one barrier formed at a bottom surface of the base corresponding to the at least one slot, a gap being defined between the bottom surface and the at least one barrier;
a fastener comprising a head, a bolt extending downwardly from the head, and at least one block extending outwardly from a periphery of the bolt, the at least one block corresponding to the at least one slot; and
a spring mounted around the bolt of the fastener;
wherein the bolt is extendable through the through hole together with the at least one block extending through the at least one slot and being temporarily received in the gap, and the fastener is then rotatable to cause the at least one block to escape from the gap and abut on the bottom surface of the base around the through hole, with the spring resiliently compressed between the head of the fastener and a top side of the base;
wherein the bolt comprises a fixed end section adjacent to the head and a free end section far away from the head, the at least one block is located at the fixed end section, and the free end section is formed with a thread on a periphery thereof.

2. The securing structure of claim 1, wherein the gap has a depth along a vertical direction substantially equaling a thickness of the at least one block.

3. The securing structure of claim 1, wherein the gap has a depth along a vertical direction larger than the thickness of the at least one block.

4. The securing structure of claim 3, wherein a difference between the depth of the gap and the thickness of the at least one block is in the range of from 0.5 millimeters to 1 millimeter.

5. The securing structure of claim 1, wherein the at least one barrier is L-shaped in cross section.

6. The securing structure of claim 5, wherein the at least one barrier comprises a first portion extending downwardly and vertically from the bottom surface of the base and a second portion extending horizontally from a bottom end of the first portion towards an area directly below the through hole, and the gap is defined between the second portion of the barrier and the bottom surface of the base.

7. The securing structure of claim 6, wherein the first portion of the at least one barrier is substantially perpendicular to the bottom surface of the base.

8. The securing structure of claim 6, wherein the at least one slot comprises an inner end communicating with the mounting hole, and an outer end away from the mounting hole, and the first portion of the at least one barrier is located at a periphery of the outer end of the at least one slot.

9. The securing structure of claim 6, wherein the second portion of the at least one barrier is located below the at least one slot.

10. The securing structure of claim 6, wherein each of the first portion and the second portion of the at least one barrier is rectangular, and the at least one block is in the form of a rectangular tab.

11. The securing structure of claim 6, wherein the at least one block has a cuneiform shape, a thickness of the at least one block gradually decreases outwardly from the bolt, and the gap has a profile corresponding to that of the at least one block.

12. The securing structure of claim 11, wherein the second portion of the at least one barrier has an upper surface inclined with respect to the bottom surface of the base.

13. The securing structure of claim 1, wherein the at least one slot comprises two slots, and the at least one block comprises two blocks corresponding to the two slots, respectively.

14. The securing structure of claim 13, wherein the two slots are symmetrically located at two opposite sides of the through hole, and the two blocks are symmetrically located at two opposite sides of the bolt.

15. The securing structure of claim 1, wherein the bolt of the fastener is column-shaped, and the through hole of the base is circular.

16. The securing structure of claim 1, wherein the at least one block extends perpendicularly and outwardly from the periphery of the bolt.

17. A securing structure, comprising:
- a base portion defining a through hole and a pair of slots, the slots located adjacent to and in communication with the through hole, a pair of stops formed at a bottom surface of the base portion corresponding to the slots, a gap defined between the bottom surface and each of the stops;
- a fastener comprising a head, a shaft extending downwardly from the head, and a pair of blocks extending outwardly from a periphery of the shaft, the blocks corresponding to the slots; and
- a spring positioned around the shaft of the fastener;
- wherein when the shaft is extended through the through hole with the blocks extending through the slots until the blocks are received in the gaps, the fastener is then rotatable to cause the blocks to escape from the gaps and resiliently abut against the bottom surface of the base portion under urging of the spring compressed between the head of the fastener and a top side of the base portion;
- wherein the shaft comprises a fixed end section adjacent to the head and a free end section far away from the head, the at least one block is located at the fixed end section, and the free end section is formed with a thread on a periphery thereof.

18. The securing structure of claim 17, wherein a difference between the depth of the gap and the thickness of each of the blocks is in the range of from 0.5 millimeters to 1 millimeter.

19. The securing structure of claim 17, wherein each of the stops is L-shaped in cross section.

* * * * *